United States Patent [19]

Moskowitz et al.

[11] 4,192,672
[45] Mar. 11, 1980

[54] SPRAY-AND-FUSE SELF-FLUXING ALLOY POWDERS

[75] Inventors: Larry N. Moskowitz, Warrensville Heights; Erhard Klar, Beachwood, both of Ohio

[73] Assignee: SCM Corporation, Cleveland, Ohio

[21] Appl. No.: 870,339

[22] Filed: Jan. 18, 1978

[51] Int. Cl.² .............................................. B22D 23/08
[52] U.S. Cl. ................................. 75/0.5 C; 75/0.5 BC; 75/251; 75/252; 75/254; 264/11; 264/12; 264/13
[58] Field of Search ........... 75/0.5 B, 0.5 BB, 0.5 BC, 75/251, 252, 254; 264/11, 12, 13

[56] References Cited
U.S. PATENT DOCUMENTS

| | | | |
|---|---|---|---|
| 2,936,229 | 5/1960 | Shepard | 75/0.5 B |
| 3,372,054 | 3/1968 | Wishnie et al. | 75/0.5 B |
| 3,378,392 | 4/1968 | Longo | 75/0.5 B |
| 3,970,445 | 7/1976 | Gale et al. | 75/0.5 B |

Primary Examiner—W. Stallard
Attorney, Agent, or Firm—Merton H. Douthitt; Gordon P. Becker; Jerry K. Mueller, Jr.

[57] ABSTRACT

A boron-containing nickel or cobalt spray-and-fuse self-fluxing alloy powder contains hard precipitates of chromium boride and, optionally, chromium carbide which are internally precipitated from a melt of said alloy. Such alloy powder is made by atomizing the melt at about the temperature at which the melt is viscous.

10 Claims, 8 Drawing Figures

SPRAY-AND-FUSE SELF-FLUXING ALLOY POWDERS

BACKGROUND OF THE INVENTION

The present invention relates to spray-and-fuse self-fluxing alloy metal powders and more particularly to such powders having relatively large hard precipitates therein for improving the wear resistance of such powders.

Spray and fuse, self-fluxing metal powders are well known in the art and widely used. They can be deposited on a base metal by any available spray process including flame spray and plasma spray, for example, and the deposit fused simultaneously or subsequently. A dense coating on the base metal results with the powder particles metallurgically bonded to the base metal. The coating or overlay can impart wear resistance, corrosion resistance, oxidation resistance, high room temperature and hot hardness, and the like to the surface of the base metal to which the coating has been applied. The alloy metal powders are used to repair or build up worn, damaged, or improperly machined parts as well as to provide protection to new parts. The metal powders usually are nickel or cobalt based and descriptions of such alloy metal powders can be formed in U.S. Pat. Nos. 2,875,043; 2,936,229; and 3,305,326, the disclosures of which are expressly incorporated herein by reference.

The present invention relates to a method of producing spray-and-fuse self-fluxing alloy powders which are very resistant to abrasive wear.

BROAD STATEMENT OF THE INVENTION

A boron-containing nickel or cobalt spray and fuse, self-fluxing metal powder contains hard precipitates of internally precipitated chromium boride, chromium carbide, or mixtures thereof. Production of said powder comprises cooling down a liquid melt of a boron-containing nickel or cobalt spray-and-fuse, self-fluxing metal alloy to about the temperature at which the melt becomes thick and viscous or to a temperature about 50° to 100° F. higher than the viscous temperature. The viscous melt then is atomized at this viscous temperature (Tv) or about 50° to 100° F. higher than the viscous temperature to produce the metal alloy powder containing hard precipitates of internally precipitated and grown chromium boride, chromium carbide, or mixtures thereof. Advantageously, at least a fraction of said precipitates are larger than about 10 microns in average particle size, and preferably larger than about 15 microns. Desirably, the alloy powder contains by its volume at least about 5%, and advantageously at least about 10%, of the internally precipitated hard precipitates.

Figure 1:
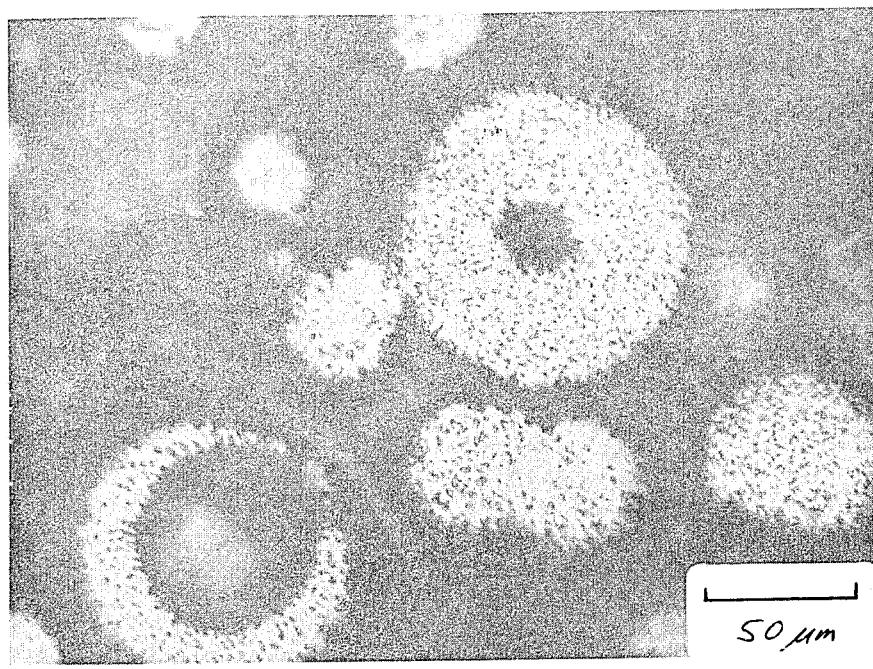
FIG. 1 is a photomicrograph of a polished cross-section of a typical conventional, atomized spray-and-fuse nickel alloy powder similar to Powders Nos. 1 and 2 of the Examples.

The alloy powders in the drawings are of composition and in preparation, substantially similar to the powders of the Examples as noted above.

DETAILED DESCRIPTION OF THE DRAWINGS

Figure 5:
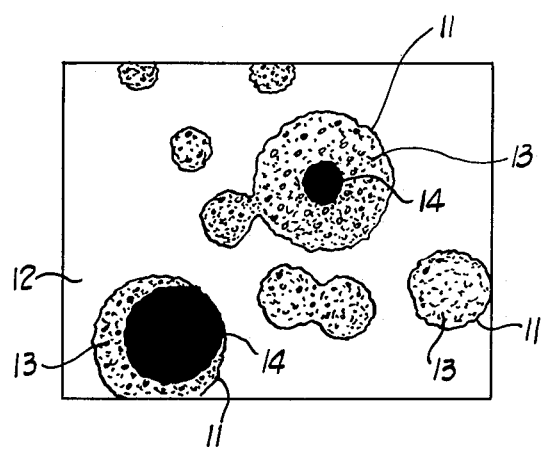
FIGS. 5–8 are sketches of FIGS. 1–4, respectively.

Referring to FIG. 5 (and FIG. 1), conventional nickel alloy powder particles 11 are shown in cross-section and are held in block mounting material 12. The powder is substantially similar in composition to Powders Nos. 1 and 2 of the Examples. Within powder particles 11 are a myriad of very fine (about 1–4 micron average size) hard precipitates 13 of chromium boride and/or chromium carbide (chromium boride and chromium carbide are practically indistinguishable in the photomicrographs). Porosity 14 is typical of most atomized metal powders.

Figure 2:
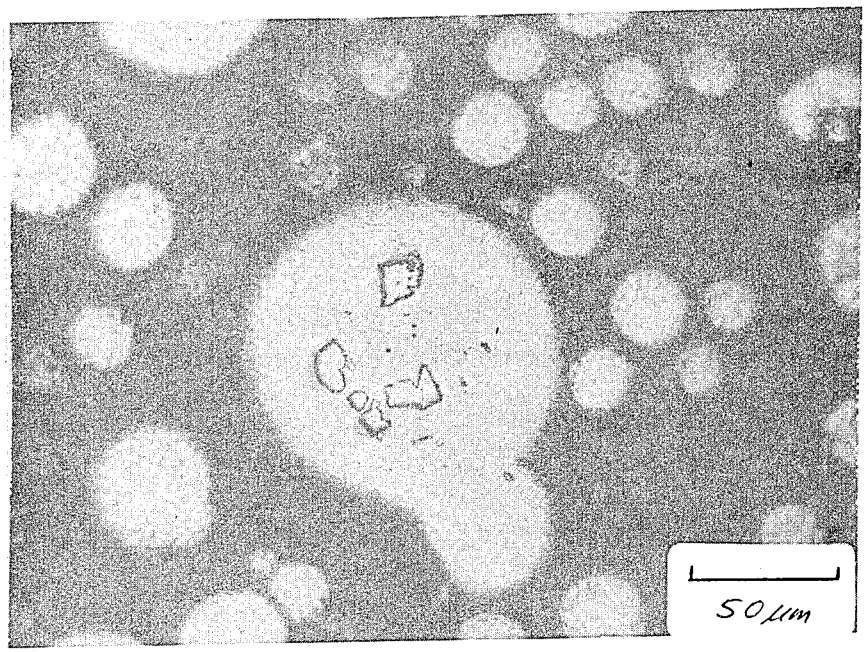
FIG. 2 is a photomicrograph of a polished cross-section of an atomized spray-and-fuse nickel alloy powder of this invention similar to Powder No. 4 of the Examples.
Figure 6:
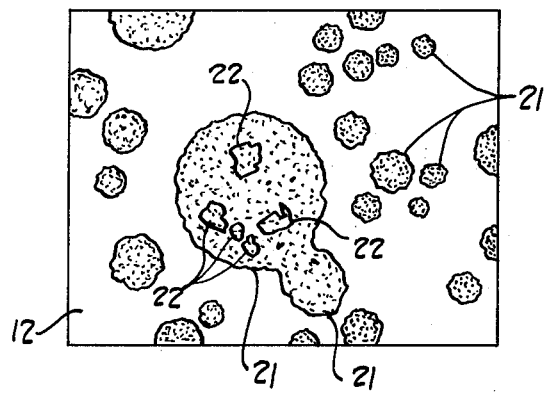

In FIG. 6 (and FIG. 2), inventive nickel alloy powder particles 21 in cross-section are held in block mounting material 12. The nickel alloy composition is substantially the same as conventional powder particles 11 of FIG. 5. Chromium boride hard precipitates 22 (no chromium carbides are seen in this cross-section of powder particles 21, but are contained in the powder) can be seen as irregular in shape. Hard precipitates 22 are rather large chromium boride particles of about 20–25 microns average particle size. The difference in size of the chromium boride precipitates contained in conventionally atomized alloy powders and such precipitates in the instant alloy powder is dramatic and readily observable from the drawings.

Figure 3:
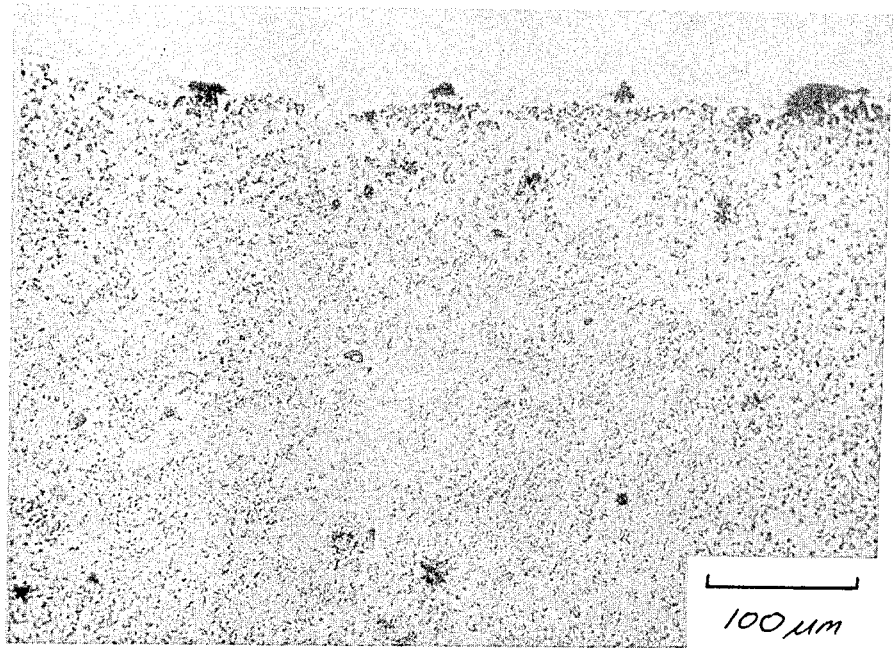
FIG. 3 is a photomicrograph of a polished cross-section of a fused coating of the conventional powder of FIG. 1.
Figure 7:
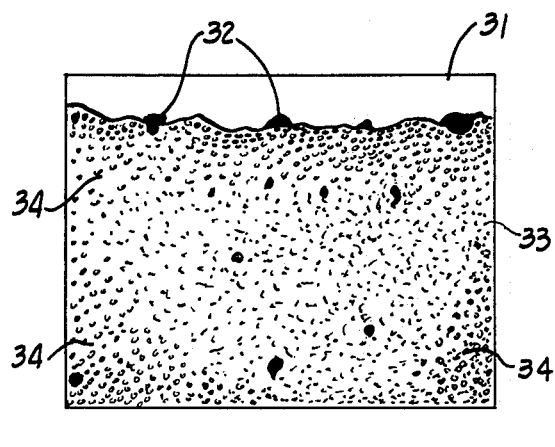

Referring to FIG. 7 (and FIG. 3), fused nickel alloy matrix 33 is coated upon steel substrate 31. Application of the powder and fusing operations were conventional. The alloy powder used to form this coating was a conventionally atomized nickel alloy powder like that powder described in FIG. 5. Porosity 32 again is typical in these kinds of fused coatings. Chromium boride/chromium carbide precipitates 34 can be seen scattered throughout nickel alloy matrix 33. Some particle size growth (e.g. about 2–6 microns) can be seen in comparing precipitates 34 in the fused coating to precipitates 13 in the conventional alloy powder shown in FIG. 5.

Figure 4:
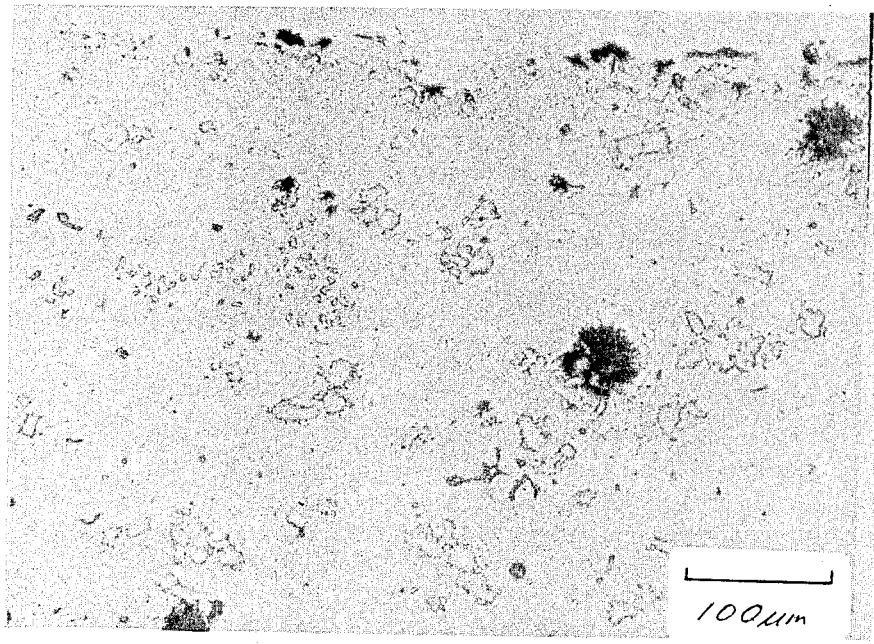
FIG. 4 is a photomicrograph of a polished cross-section of a fused coating of the inventive powder of FIG. 2.
Figure 8:
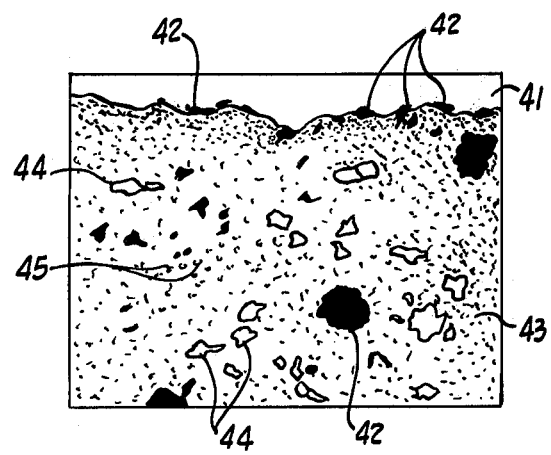

Referring to FIG. 8 (and FIG. 4), fused nickel alloy matrix 43 is coated on steel substrate 41 and comes from inventive nickel alloy powder like that shown in FIG. 6. Porosity 42 again is seen. Contained within matrix 43 are a primary distribution of larger (about 15–35 microns) chromium boride precipitates 44 and a secondary distribution of smaller (about 3–10 microns) chromium boride precipitates 45. Again, particle size growth of the precipitates has occurred between the powder and the fused coating. This bimodal distribution of the hard precipitates is unique to the powder of this invention and the difference between a fused coating from conventional powders compared to the instant inventive powders is dramatic.

DETAILED DESCRIPTION OF THE INVENTION

The basic spray-and-fuse, self-fluxing metal powder is conventional in composition such as those metal powders found, for example, in the following U.S. Pat. Nos. 2,875,043; 2,936,229; and 3,305,326; the disclosures of which are expressly incorporated herein by reference. Typically, a variety of other components are added to the basic nickel or cobalt matrix metal for providing a variety of special properties. Additions of silicon or boron are responsible for advantageous fluxing characteristics by forming low melting point glasses. Silicon and boron also lower the melting point of the alloy to facilitate spraying and fusing operations by forming lower melting point eutectic phases. Chromium is added to provide greater corrosion and oxidation resistance to the matrix. Chromium also combines with boron and carbon to form the hard precipitates responsible for wear and abrasion resistance. Copper and molybdenum can be added to the matrix metal for decreasing the fluidity during fusing of the applied metal powder and permit buildup of thicker coatings on the base metal to which the alloy powder is applied. On occasion, it can be advantageous to add aluminum to the matrix metal as a deoxidant and/or for obtaining a self-fusing alloy metal powder.

Some chemical compositions of commonly used nickel-based self-fluxing alloys suitable for use in the present invention are given in Table I for exemplary purposes.

TABLE I

| COMPOSITION (WEIGHT PERCENT) | | | | | | | | ROCKWELL HARDNESS |
|---|---|---|---|---|---|---|---|---|
| Ni | Cr | Fe | Si | B | C | Mo | Cu | (Rc) |
| bal. | 8.0–11.0 | 2.5–3.6 | 2.5–3.5 | 1.3–2.0 | 0.6 max. | | | 33–40 |
| bal. | 11.0–14.0 | 3.5–4.75 | 3.5–4.5 | 2.25–3.0 | .45–.65 | | | 48–54 |
| bal. | 12.0–16.0 | 3.75–5.0 | 3.75–4.75 | 2.75–3.5 | .55–.75 | | | 55–61 |
| bal. | 12.0–16.0 | 3.75–5.0 | 3.75–4.75 | 2.75–3.5 | .55–.75 | 2.0–2.9 | 2.0–2.9 | 55–61 |

A representative chemical composition of a cobalt-based self-fluxing alloy suitable for use in the present invention is given below:

TABLE II

| Component | Weight-% |
|---|---|
| Co | Balance |
| Ni | 18.0–21.0 |
| Cr | 18.0–20.0 |
| Fe | 1.0–4.0 |
| Si | 3.2–3.8 |
| B | 2.8–3.2 |
| C | 0.5–0.8 |
| W | 5.0–8.0 |
| Rockwell Hardness (Rc) | 55–61 |

Other representative nickel and cobalt alloy powder compositions can be found in the reference patents cited above and/or are well-known in the art.

The microstructure of the alloy powder consists basically of a matrix of nickel-rich solid solution and eutectic with dispersed hard particles therein. The eutectic is actually a complex mixture of low melting eutectic phases. During fusing operations, the eutectic liquefies for a short period of time, thus closing the porosity of the deposit.

The alloy powder generally should not have a mesh size above about 100 mesh (Tyler Standard Sieves Series) with the exact size depending upon the particular equipment used for spraying and the particular fuel gas. For example, when intended for spraying with a plasma flame, the particles should be of a size of between about 100 mesh to about 8 microns, and preferably between 270 mesh to 15 microns. For use with acetylene, the particles should all be below about 115 mesh with not more than about 15% below 325 mesh. When intended for spraying with hydrogen as the fuel gas, the lower limit is about 5 microns and all particles may be below 325 mesh.

Conventionally, the superheat temperatures used in melting and pouring the alloys for atomization normally are higher than those used in standard casting foundry practice. In the atomization process, small orifices and low pouring rates are involved relative to casting techniques. The higher temperatures, therefore, are necessary to prevent the melt from thickening or freezing before the liquid metal stream is disintegrated. In general, melt temperatures of about 150° to 200° F. above the melting point are used in conventional atomization processes, and often higher temperatures are used if the fluidity of the melt is low. In conventional spray and fuse, self-fluxing alloy metal powders, the pouring temperature during atomization is kept at a minimum of 2600° F. and more often at a higher temperature than this. (The liquidus temperatures that are reported usually for these alloys range from about 1800° F. to 2200° F. depending upon their composition.) In the present process, the alloy melt is cooled to a temperature whereat the fluidity of the molten metal drops abruptly and it becomes thick and viscous. The actual upper temperature limit where this viscous condition begins or ends depends somewhat upon the heating rate and cooling rate used and certainly upon the chemistry of the melt. Typically, the viscous condition occurs at a temperature somewhere below about 2500° F. The viscous condition of the melt is readily observed in actual practice. For present purposes, the term "alloy melt" means the melt of the components which is formed for producing the novel alloy powder of this invention.

In the present process, the melt is poured for commencement of atomization when the molten alloy is in this viscous state or at a temperature not substantially higher than about 100° F. above the temperature at which the viscous state commences and preferably not substantially above about 50° F. higher than the viscous temperature. Of course, it is recognized that the upper viscous temperature limit may be affected by the composition of the alloy so the above temperature limitations are given as a guide in practicing the present invention. Some preliminary testing of the alloy melt is recommended in order to establish the requisite viscous temperature of each particular alloy powder as a function of its composition. The same is true regarding the lower temperature limit of the viscous state of the alloy melt. Of course, the melt also must be at a sufficient temperature for atomizing the melt.

Typically, the molten stream of metal exiting the orifice is subjected to the action of jets of water which are directed upon such stream to assist in the atomization. Of course, gas-assisted atomization or other conventional techniques may be employed. On occasion it may be desirable to conduct a shotting operation to produce rather large particles of the metal alloy and then subject such particles to size reduction by conventional attrition techniques in order to produce the desired sized alloy powder and also have a rather narrow size distribution of such powder. Further, cutting finer and coarser (oversized) alloy particles from the atomizing operation is recommended procedure regardless of the particular type of atomization procedure used in making the alloy metal powder of this invention.

The resultant powder from the atomization process (with or without subsequent size reduction) is unique because of the internally precipitated chromium boride and/or chromium carbide precipitates contained therein. Such hard precipitates generally are larger in size than the chromium boride particles typical of conventionally atomized alloy powders which atomize the melt at higher temperatures whereat such melt is not in the viscous state. It may be desirable to conduct the present invention in such fashion that a distribution of intermediate precipitates results, eg. precipitates of about 4 to 10 microns in size or even somewhat larger. Such sized precipitates in the alloy powder would provide an improved powder over conventionally atomized powders of substantially similar composition. On other occasions, it may be desirable to conduct the present process in such fashion to provide rather large hard precipitates in the powder, eg. precipitates to about 10 microns to 50 microns and even larger. A much improved alloy powder would result from such very large hard precipitates.

A presently preferred embodiment of the present invention results when the resultant powder contains very large precipitates of chromium boride as well as a smaller amount of very large chromium carbides. The microstructure of the resulting spray-and-fuse powder produced in accordance with this embodiment exhibits very large chromium boride particles, typically ranging up to about 20 to 25 microns and frequently up to 50 microns in size and larger. There is observed also a smaller number of chromium carbides, some of which are even larger in size than the chromium boride particles. Additionally, a secondary distribution of finer chromium boride particles typically ranging in size from about two to ten microns in diameter normally is seen distributed in the matrix. It is to be noted that the distribution of these hard participitates can be fairly uniform throughout the alloy powder since the hard precipitates are precipitated and grown internally in the resulting alloy powder, but such uniformity in distribution of the hard precipitates is not restrictive of the performance of the present alloy powder. Such dual or bimodal distribution of the hard precipitates in the alloy powder is unique and provides a superior powder over conventionally atomized alloy powders. It should be understood that some preformed hard precipitates (chromium carbide, chromium boride, tungstun carbide, etc.) may be added to the melt prior to atomization in order to augment the internally precipitated hard precipitates formed by the present process, but generally such added hard particles should be relatively few in number and in amount compared to the amount of hard precipitates formed by the present process. Generally, the internally precipitated hard precipitates range from about 5% to 35% and higher by volume of the alloy powder.

In most other respects, the powder appears and exhibits characteristics akin to commercially available atomized self-fluxing alloy powders. The bulk hardness of the coating produced from the present powder is about the same as in conventionally atomized powders and the other microstructural features also appear to be similar to those found in conventional atomized powders. However, the size and distribution of the hard precipitates, especially chromium boride, formed in powders atomized by the instant process are unique and make such powders well equipped to provide much better resistance to abrasive wear and other properties than heretofore is provided by commercially atomized powders.

The following Examples show how the instant invention can be practiced, but should not be construed as limiting the invention. In this application, all parts are parts by weight, all mesh sizes are Tyler Standard Sieves Series, all percentages are weight percentages, and all temperatures are in degress Fahrenheit, unless otherwise expressly indicated.

EXAMPLES

Comparative measurements of abrasion resistance of coatings obtained from powders made according to the present invention and from standard commercially available powders were conducted. The following powders were used:

Powder No. 1: Code 74-M-60, a standard commercial grade of atomized nickel-based powder manufactured by Glidden Metals, SCM Corporation, Cleveland, Ohio.

Powder No. 2: Code 74-W-60, a standard grade of atomized nickel-based powder manufactured by Glidden Metals, SCM Corporation, Cleveland, Ohio.

Powder No. 3: COLMONOY No. 6, a crushed nickel-based powder with separately produced and added CrB particles manufactured by Wall Colmonoy Company, Detroit, Michigan, COLMONOY being a registered trademark.

Powder No. 4: Nickel-based powder made according to the instant invention with an atomization pouring temperature of 2300° F. (melt in viscous state).

Powder No. 5: Nickel-based powder made according to the instant invention with an atomization pouring temperature of 2400° F. (melt at temperature just above viscous state temperature).

Powders Nos. 4 and 5 were each made by forming a 12-pound melt of the components and cooling down the molten melt to the indicated pouring temperature. Atomization was conducted using a ⅜" orifice with a pouring rate of about 40–50 lbs. per minute with water jets directed upon the stream to assist in the atomization. Nominal particle size of all powders ranged from about 150 to 325 mesh with finer and oversized particles being cut from the alloy powder product.

Each of the five powders has nearly the same chemical composition and each forms a fused coating with about the same bulk hardness. The microstructures of each powder with respect to the size and distribution of the hard particles, however, vary greatly. In powders Nos. 1 and 2, the hard particles (chromium boride and chromium carbide) ranged in particle size from about 1 to 4 microns in diameter and occupied about 21% by volume of the alloy powder. In powder No. 3, the separately produced and added hard particles (chromium boride) were of about 5 to 10 microns in particle size and were measured at about 13% by volume of this powder. In powder No. 4 made in accordance with the present invention, the hard precipitates (chromium boride and chromium carbide) ranged in size from about 8 to 20 microns. The proportion of such precipitates was about 11% by volume of the alloy powder. In powder No. 5 made in accordance with the present invention, there was a primary distribution of hard precipitates ranging from about 9 to 25 microns in a proportion of about 3% to 5% by volume. Also, there was a secondary distribution of smaller precipitates ranging from about 2 to 7 microns. The total of these smaller precipitates was about 33% by volume of the powder.

The fused coatings of these powders also were subjected to analysis in the same fashion as were the powders. For the fused coatings from powders Nos. 1 and 2, the hard particles ranged in particle size from about 2 to 6 microns and were present at about 21% by volume of the fused coating. For powder No. 3, the chromium boride particles (separately formed and added during the powder formation process) still ranged from about 5 to 10 microns and were present at about 6% to 7% by volume of the fused coating.

For powder No. 4, the hard precipitates ranged in size from about 15 to 35 microns and were present at about 8% to 9% by volume. For powder No. 5, the primary distribution of larger hard precipitates ranged from about 15 to 35 microns and the secondary distribution of smaller hard precipitates ranged from about 2 to 7 microns. The total of all hard precipitates was about 20% by volume with the primary distribution being estimated at about 3% to 5% by volume.

Table III below summarizes and compares the above-reported measurements of the hard precipitates contained in the powders and fused coatings of Powders Nos. 1–5.

TABLE III

| Powder No. | Hard Precipitates in Powder | | Hard Precipitates in Fused Coating | |
|---|---|---|---|---|
| | Size (microns) | Volume-% | Size (microns) | Volume-% |
| 1 and 2 | 1–4 | 21% | 2–6 | 21% |
| 3 | 5–10 | 13% | 5–10 | 6–7% |
| 4 | 8–20 | 11% | 15–35 | 8–9% |
| 5 | | | | |
| Primary Distribution | 9–25 | 3–5% | 15–35 | 3–5% |
| Secondary Distribution | 2–7 | 33% | 2–7 | 15–17% |

The increase in particle size of the hard particles in the fused coatings is typical of these types of powders. Note should be taken, though, that the fused coatings from the inventive powders Nos. 4 and 5, do contain much larger hard precipitates than the comparative powders. The variations in volume percentages between the powders and fused coatings are most likely functions of the following factors. Typically in atomized powders, some powder particles contain little or no hard precipitates while other powder particles are quite rich in the hard precipitates. The foregoing measurement were taken from powder particles rich in the hard precipitates and, thus, the reported values would tend to be higher than the actual values for a given batch of powder particles containing a mixture of powder particles more or less rich in the hard precipitates. Also, the measurements were taken from cross-sectional cuts of the powder particles whereat the concentration of the chromium borides may be greater than in the outer areas of the powder particles. The cross-sectional cuts of the fused coatings, however, should be quite accurate and representative of the entire coating. Conventional grid measurements using the point count method on photomicrographs like those of the drawings were used in order to determine the volume of the hard precipitates and their size was determined by scaled measurements of the photomicrographs.

Typical chemical composition of each powder in weight-percent is given below:

| | |
|---|---|
| Ni | balance |
| Cr | 13.5% |
| Fe | 4.7% |
| Si | 4.3% |
| B | 3.0% |
| C | 0.6% |

Also, each powder had a bulk Rockwell hardness (C scale) of 55–61.

Each powder was applied onto steel rods (3 inches long by 0.5 in diameter) by a standard oxygen-acetylene flame spray procedure followed by torch fusing. Each powder was screened for and sprayed with the manufacturer's recommended equipment and procedures.

The relative abrasion resistance of each coating was determined by grinding each coated rod to a uniform diameter of about 0.58 inches (corresponding to a coating thickness of about 0.04 inches) on a centerless grinding machine with a silicon carbide grinding wheel.

The uniformly ground bars then each were fed in repeatedly and ground 0.005 inches per pass. The number of passes required to begin dulling the silicon carbide wheel was recorded as was the number of passes required to fully dull the wheel to an extent requiring re-dressing of the wheel. The results recorded appear below in Table IV.

TABLE IV

| | NUMBER OF PASSES TO: | |
|---|---|---|
| POWDER NO. | START DULLING | FULLY DULL |
| 1 | >8* | >8 |
| 2 | >8 | >8 |
| 3 | 4 | 5 |
| 4 | 3 | 4 |
| 5 | 4 | 7 |

*Entire coating ground off after 8 passes at which time the test was stopped.

The foregoing results show that Powder No. 3 (separately produced and added CrB crushed powder) is better in abrasion resistance to conventionally atomized powders Nos. 1 and 2. However, powders Nos. 4 and 5 of this invention also are not only superior in abrasion resistance to powders Nos. 1 and 2, but powder No. 5 is roughly as good as powder No. 3 and Powder No. 4 is even more abrasion-resistant than is Powder No. 3.

We claim:

1. A boron-containing nickel or cobalt spray-and-fuse, self-fluxing alloy powder containing hard precipitates of chromium boride and/or chromium carbide which precipitates are internally precipitated from a viscous melt of said alloy, at least about 5% of said precipitates by volume of said powder have an average size of at least about 10 microns.

2. The alloy powder of claim 1 wherein said precipitates are at least about 15 microns in average particle size.

3. The alloy powder of claim 1 wherein said precipitates range from about 10 microns to about 50 microns.

4. The alloy powder of claim 1 which contains a primary distribution of at least about 5% by volume of said precipitates of about 20 to 25 microns average particle size and a secondary distribution of said precipitates of about 5 to 10 microns in average particle size.

5. The alloy powder of claim 4 wherein said primary and said secondary distribution of said precipitates together ranges between about 5% and about 35% by volume of said alloy powder.

6. The alloy powder of claim 4 wherein the volume ratio of said primary distribution to said secondary distribution ranges between about 0.16 and 6.

7. The alloy powder of claim 1 which also contains internally precipitated hard precipitates of chromium carbide and of chromium boride.

8. The alloy powder of claim 5 which also contains internally precipitated hard precipitates of chromium carbide and of chromium boride.

9. A metal article coated with a fused coating of the alloy powder of claim 1.

10. A metal article coated with a fused coating of the alloy powder of claim 5.

* * * * *

UNITED STATES PATENT AND TRADEMARK OFFICE
CERTIFICATE OF CORRECTION

PATENT NO. : 4,192,672
DATED : March 11, 1980

INVENTOR(S) : LARRY N. MOSKOWITZ and ERHARD KLAR

It is certified that error appears in the above–identified patent and that said Letters Patent are hereby corrected as shown below:

Column 10, lines 10-13, delete claims 9 and 10.

On the title page "10 Claims" should read --8 Claims--.

Signed and Sealed this

Twenty-second Day of February 1983

[SEAL]

Attest:

GERALD J. MOSSINGHOFF

Attesting Officer

Commissioner of Patents and Trademarks